United States Patent
Eberhardt et al.

(10) Patent No.: US 8,222,336 B2
(45) Date of Patent: Jul. 17, 2012

(54) HOTMELT ADHESIVE WITH IMPROVED ADHESION

(75) Inventors: Ralf Eberhardt, Aalen (DE); Gunter Hoffmann, Bopfingen (DE); Katja Strauss, Nördlingen (DE); Ralf Grauel, Hilden (DE); Richard Scholta, Köln (DE); Volker Kels, Neuss (DE); Dirk Kasper, Düsseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 599 days.

(21) Appl. No.: 12/390,876

(22) Filed: Feb. 23, 2009

(65) Prior Publication Data
US 2009/0202847 A1 Aug. 13, 2009

Related U.S. Application Data

(63) Continuation of application No. PCT/EP2007/056341, filed on Jun. 26, 2007.

(30) Foreign Application Priority Data

Aug. 25, 2006 (DE) .................. 10 2006 039 833

(51) Int. Cl.
*C09B 67/00* (2006.01)
*C08G 63/60* (2006.01)

(52) U.S. Cl. ........................................ 524/502; 524/599

(58) Field of Classification Search ............ 524/502
See application file for complete search history.

(56) References Cited

U.S. PATENT DOCUMENTS

| 5,075,382 | A | * | 12/1991 | Ohmae et al. ........... 525/285 |
| 5,530,054 | A | | 6/1996 | Tse et al. |
| 5,670,566 | A | | 9/1997 | Liedermooy et al. |
| 6,107,430 | A | | 8/2000 | Dubois et al. |
| 6,319,979 | B1 | | 11/2001 | Dubois et al. |
| 6,872,279 | B1 | | 3/2005 | Kolowrot et al. |
| 7,199,180 | B1 | | 4/2007 | Simmons et al. |
| 2005/0176868 | A1 | * | 8/2005 | He et al. ................. 524/487 |
| 2007/0042193 | A1 | * | 2/2007 | Wang .................... 428/423.1 |
| 2008/0132625 | A1 | | 6/2008 | Niehaus et al. |
| 2011/0213067 | A1 | | 9/2011 | Moeller et al. |

FOREIGN PATENT DOCUMENTS
WO 0110967 A1 2/2001
WO 2005028584 A1 3/2005

OTHER PUBLICATIONS

Technical data sheet of Escor AT 310, Jul. 2011.*
Technical data sheet of Escor AT 320, Jul. 2011.*
"Data Sheet NUCREL AE: NUCREL AE high-performance adhesive and sealant resins" Du Pont Packaging, Retrieved from http://www2.dupont.com/nucrel/en_us/assets/downloads/nucrel_ae on Oct. 9, 2005, XP-002454356.

* cited by examiner

Primary Examiner — Ling Choi
Assistant Examiner — Hui Chin
(74) Attorney, Agent, or Firm — Sun Hee Lehmann

(57) ABSTRACT

The invention relates to a hotmelt adhesive based on at least one ethylene and/or propylene/$C_4$ to $C_{20}$ α-olefin copolymer obtainable by metallocene-catalysed polymerization, on at least one tackifying resin, and on at least 0.1% to 15% by weight of a copolymer or terpolymer based on $C_2$ to $C_5$ olefins with (meth)acrylic esters of low molecular mass alkanols, the copolymer containing COOH groups or anhydride groups, and also, if desired, on wax and additives, and to its use for bonding finished substrate surfaces.

10 Claims, No Drawings

HOTMELT ADHESIVE WITH IMPROVED ADHESION

CROSS REFERENCE TO RELATED APPLICATIONS

This application is a continuation of PCT/EP2007/056341 filed Jun. 26, 2007, which claims the benefit of DE 10 2006 039 833.5, filed Aug. 25, 2006, the complete disclosures of which are hereby incorporated by reference in their entirety.

The present invention relates to a hot melt adhesive based on at least one polyethylene and/or polypropylene (co)polymer, on a further thermoplastic polymer based on an ethylene/(meth)acrylic acid ester/unsaturated carboxylic acid terpolymer, on at least one tackifying resin, and optionally on waxes and additives. The invention likewise relates to the use of said hot melt adhesive for the adhesive bonding of packages and paperboard products, especially of substrates having finished surfaces such as plastic or metal coatings and other coatings, as well as special varnishes.

"Hot melt adhesives" are understood as adhesives that are applied as melts onto the parts to be adhesively bonded, and that set and solidify upon cooling. Hot melt adhesives are widely used industrially; in the packaging and paper industry, for example, they are used to seal, close, and assemble cartons and folding boxes, or for lamination of multi-layer papers. Many requirements must be met by such hot melt adhesives for these various applications.

For example, hot melt adhesives must possess a moderate to long open time (defined as the time span between adhesive application and assembly of the parts being joined), but after immobilization of the parts being joined must set quickly enough to ensure an adhesive bond of appropriate quality, particularly on high-speed packaging machines. In addition to setting speed, viscosity is an important criterion for selection of a hot melt adhesive. For automated processing, especially for uniform hot melt adhesive application, the viscosity should be sufficiently low at a corresponding application temperature. For adhesive bonds on packages in the frozen-food sector, appropriate low-temperature flexibility should exist. In other words, at low temperature the adhesive bond should exhibit high strength, and the adhesive should not become brittle or break. On the other hand, food or beverage packages are often filled warm or hot, so that a correspondingly high high-temperature strength is required here for the adhesive. "Sufficient high-temperature strength" is to be understood to mean that once set, the adhesive does not immediately soften when acted upon again by elevated temperature, thus causing the adhesive bond to release and/or the adhesively bonded parts to shift with respect to one another. On the other hand, the packaging material substrates possess a wide range of surface characteristics. For example, substrate surfaces can be finished with plastic, metal, or other coatings, or with varnishes. These surface finishes require special adhesive properties in order to achieve good bond strengths. To allow universal use of the hot melt adhesive, it must possess a broad spectrum of adhesion to the aforesaid substrates. Hot melt adhesives are highly thermally stressed over long periods of time upon application. One important requirement is therefore good thermal stability at application temperature. The thermal stability of hot melt adhesives depends, among other factors, on the compatibility of the components on which the hot melt adhesive is based. Incompatibility often exists especially in the case of components that enhance adhesion, in particular with hot melt adhesives based on nonpolar polyethylene or polypropylene (co)polymers. A further requirement, especially for the food industry, is that hot melt adhesives that are as odor-free as possible, or low in odor, must be provided.

Hot melt adhesives based on polyethylene or polypropylene homo- or copolymers are known. DE 696 02 035 T2, for example, describes a packaging hot melt adhesive that contains as constituents at least one ethylene/n-butyl acrylate copolymer, a colophon ester tackifying resin, a microcrystalline wax or paraffin wax, and a polymeric additive that can also be an ethylene or propylene homo- or copolymer.

U.S. Pat. No. 6,107,430 describes a hot melt adhesive that contains at least one linear homogeneous ethylene/$C_3$ to $C_{20}$ α-olefin copolymer that has a specific gravity from 0.850 g/cm$^3$ to 0.895 g/cm$^3$. The copolymer is intended to have a viscosity from 2000 mPas to 18,000 mPas. Additional ethylene/acrylate copolymers having free carboxyl groups are not described.

Also known is U.S. Pat. No. 5,530,054, which describes a hot melt adhesive that is made up substantially of a copolymer based on ethylene and $C_4$ to $C_{20}$ α-olefins and contains a hydrocarbon tackifying resin, this having a softening point of between 70 and 130° C. The ethylene/α-olefin copolymers are manufactured by metallocene catalysis and are contained in the hot melt adhesive at proportions from 30 to 70 wt %. Additional polymers on an ethylene/acrylate ester basis having carboxyl groups are not described.

DE 199 44 225 describes sprayable hot melt adhesives that contain 30 to 70 wt % of a substantially amorphous poly-α-olefin copolymer, the latter is said to have a specific gravity <0.90 g/cm$^3$ and a melt viscosity of between 1000 and 20,000 mPas. Polyolefins that can be manufactured by radical breakdown of poly-α-olefins are described in particular. Also described, in order to improve compatibility, is the modification of said poly-α-olefins with unsaturated carboxylic acids or anhydrides thereof.

WO 2005/028584 describes hot melt adhesives manufactured on the basis of metallocene catalysis. Described as additives, among others, are copolymers based on ethylene/methyl acrylate esters having a predetermined methyl acrylate content, ethylene/acrylic acid having specific concentrations of carboxyl groups, or ethylene/butyl acrylate. Terpolymers are not described.

Disadvantages that may be identified for the hot melt adhesives of the existing art are that good processing properties are possible, but that adhesion to, and permanent adhesive bonding of, difficult substrates is disadvantageously influenced.

A guarantee of good bond strengths at the various storage temperatures that are encountered, by way of specific adhesive properties of hot melt adhesives based on polyethylene and/or polypropylene (co)polymers with respect to substrate surfaces that have been finished with plastic, metal, grease-repelling substances, or varnishes, exists to only a limited extent.

There is also no guarantee, based on the existing art, that hot melt adhesives based on polyethylene and/or polypropylene (co)polymers having corresponding additives possess sufficiently good thermal stability (achieved, in particular, by good compatibility of the hot melt adhesive components) at application temperature.

The object of the present invention is therefore to make available a hot melt adhesive based on polyethylene or polypropylene (co)polymers, with rapid setting and good processing behavior, that possesses specific adhesive properties with respect to substrates finished with plastics, metals, grease-repelling substances, or varnishes in order to achieve high bond strengths at the various storage temperatures, and that ensures excellent thermal stability in the melt.

The object is achieved in that a hot melt adhesive is made available containing 10 to 80 wt % of at least one copolymer, based on ethylene and/or propylene and $C_4$ to $C_{20}$ α-olefins, that is obtainable by metallocene-catalyzed polymerization; 5 to 60 wt % of at least one tackifying resin; 0.1 to 15 wt % of at least one polymerizate based on $C_2$ to $C_5$ olefins and (meth) acrylic acid esters, the polymerizate containing COOH groups or anhydride groups; and 0 to 45 wt % additives. The sum of the constituents is to equal 100%.

A further subject of the invention is the use of such hot melt adhesives for the adhesive bonding of packages and paperboard products, the adhesively bonded surfaces being finished with plastics, metals, grease-repelling substances, or varnishes. A further subject of the invention is the use of such adhesives for the bonding of packages having plastic shaped parts such as closures, spouts, etc.

The hot melt adhesive according to the present invention contains at least one homo- or copolymer based on ethylene and/or propylene, as well as optionally further copolymerizable monomers. The monomers that can be used in addition to ethylene and/or propylene are the known olefinically unsaturated monomers that are copolymerizable with ethylene/propylene. This refers in particular to linear or branched $C_4$ to $C_{20}$ α-olefins such as butene, hexene, methylpentene, octene; cyclically unsaturated compounds such as norbornene or norbornadiene; symmetrically or asymmetrically substituted ethylene derivatives, $C_1$ to $C_{12}$ alkyl radicals being suitable as substituents. These can be homopolymers or copolymers, which can also contain further monomers. "Homo/copolymers" are also to be understood hereinafter as those polymers made up of more than two monomers. The quantity of comonomers is preferably to be below 30%. These are often amorphous atactic polyolefins. An embodiment of the invention uses copolymers based on $C_2$ with $C_4$ to $C_{20}$ α-olefins. Another embodiment uses polymers of $C_3$ with $C_4$ to $C_{20}$ α-olefins. Copolymers based on ethylene/propylene are also suitable.

The (co)polymers thereby obtained have a molecular weight from 1000 to 200,000 g/mol, in particular from 1000 to 50,000, particularly preferably up to 30,000 g/mol (molecular weight as numerical average ($M_N$) determined with the GPC method). The lower limit is 1000 g/mol, preferably 1500 g/mol. Particularly suitable are those polymers that are manufactured by catalysis using metallocene compounds. The melt index of these polymers is intended to be greater than 5 g/10 min, preferably more than 30 g/10 min, in particular above 100 g/10 min (measured at 190° C., 2.16 kg, DIN ISO 1133). The viscosity of such polymers is generally low. The softening point of the polymers is to be below 200° C., in particular below 160° C. The quantity of said copolymers is to be 10 to 80 wt %, in particular between 10 and 60 wt %.

These polymers are known in the literature and can be obtained commercially from various manufacturers. The (co) polymer can be one polymer, but it is also possible to use a mixture of up to three polymers.

As a further constituent, the hot melt adhesive according to the present invention contains at least one tackifying resin. The resin produces additional tackiness. It is used at a quantity of 5 to 60 wt %, preferably 10 to 50 wt %. This refers, in particular, to resins that possess a softening point from 70 to 140° C. (measured per ASTM E28). These are, for example, aromatic, aliphatic, or cycloaliphatic hydrocarbon resins, as well as modified or hydrogenated derivatives. Further resins usable in the context of the invention are, for example, polyterpene resins, phenolically or aromatically modified polyterpene resins, modified natural resins such as resin acids from balsam resin, tall rosin, or wood rosin, optionally also hydroabietyl alcohol and esters thereof, acrylic acid copolymers such as styrenelacrylic acid copolymers, and resins based on functional hydrocarbon resins. It is preferred to use partly or completely hydrogenated hydrocarbon resin and colophon resin.

It is essential to the present invention that at least one polymerizate based on olefins and (meth)acrylic acid esters, that comprises carboxyl groups and/or anhydride groups, be contained in the hot melt adhesive. The olefin monomers can be selected from the known $C_2$ to $C_5$ olefins, in particular ethylene or propylene. The (meth)acrylic acid esters are selected from esters with low-molecular-weight $C_1$ to $C_8$ alkanols; methyl(meth)acrylate, ethyl(meth)acrylate, propyl (meth)acrylate, butyl(meth)acrylate, or 2-ethylhexyl(meth) acrylate, individually or in a mixture, are particularly suitable. The copolymer must also comprise carboxyl groups and/or anhydride groups. This can be effected by subsequent modification of the copolymers, or by polymerization. For example, it is possible to introduce COOH groups by oxidation. It is additionally known to introduce COOH or anhydride groups into the polymer by radical grafting reactions, for example using maleic acid anhydride.

In a preferred embodiment of the polymerizate, however, it is a terpolymer based on olefins and (meth)acrylic acid esters with acid-group- or anhydride-group-containing unsaturated monomers. These monomers can be selected, for example, from copolymerizable unsaturated monocarboxylic acids such as (meth)acrylic acid, crotonic acid, itaconic acid, citraconic acid; unsaturated dicarboxylic acids such as maleic or fumaric acid, semiesters of maleic/fumaric acid with $C_1$ to $C_8$ alkanols; anhydrides of such acids. Derivatives of maleic acid are particularly suitable. The quantity of acid-group- or anhydride-group-containing monomers is to be between 0.1 and 7.5 wt %.

The copolymers are intended to have a molecular weight (Mn) between 3000 and 50,000 g/mol, in particular 8000 to 25,000 g/mol. The number of COOH/anhydride groups is to equal between 1 and 100 mg KOH/g, in particular between 5 and 50 mg KOH/g. If the number of carboxyl groups is high, the compatibility of the constituents of the hot melt adhesive is critical; if the number of carboxyl groups is low, adhesion is degraded. Regardless of the molecular weight, it is useful in the interest of obtaining good processability that the melt index of the polymerizate be high. The melt index of the polymerizate is intended to be between 1 and 1000 g/10 min, and in particular greater than or equal to 100 g/10 min (measured per DIN ISO 1133 at 190° C., 2.16 kg), preferably greater than or equal to 200 g/10 min. The softening point is to be between 70° C. and 140° C. The quantity of COOH-group-carrying polymerizate is to be between 0.1 and 15 wt %, in particular between 1 and 10 wt %.

The polymerizates are to possess a concentration of (meth) acrylic acid esters, or derivatives thereof, from 0.1 to 60 wt %, in particular 1 to 35 wt %; and a concentration of acid-group- or anhydride-group-containing monomers from 0.1 to 7.5 wt %, in particular 0.2 to 5 wt %. The melting point of a preferred polymerizate is to be between 50 and 150° C., in particular between 80 and 120° C. (DSC method). Suitable polymerizates comprising carboxyl groups are commercially obtainable and known to one skilled in the art.

The hot melt adhesives according to the present invention can also contain, in addition to the aforesaid constituents, further constituents usually used in hot melt adhesives as additives. These include, for example, plasticizers, stabilizers, waxes, adhesion promoters, and antioxidants. Specific applications-engineering properties such as, for example, cohesive strength, viscosity, and softening point can thereby be influenced. In addition, fillers can be used to increase strength and, if applicable, to reduce cost.

In addition to the aforementioned constituents, the hot melt adhesive can if applicable also contain elastic thermoplastic polymers. Such elastic polymers are to be understood in particular as styrene block copolymers that can exhibit elastic or rubber-elastic properties. These can be two-block or three-block copolymers that can comprise at least one styrene block. Examples thereof are SBR, SAN, styrene-isoprene copolymers (SIS), styrene-ethylene/butylene copolymers (SEBS), styrene-ethylene/propylene copolymers (SEPS), styrene-isoprene-butylene copolymers (SIBS), styrene-butadiene copolymers (SBS), hydrogenated styrene-butylene-butadiene copolymers (SBBS). Block copolymers of this kind are known to one skilled in the art and are commercially obtainable. The properties of the block copolymer can be influenced by way of the length of the styrene blocks.

The polymers are to be selected by one skilled in the art in such a way that good compatibility exists with the other constituents of the hot melt adhesive. The quantity of copolymers can be 0.1 to 25 wt %; in particular, 0.5 to 15 wt % of at least one thermoplastic elastomer is to be contained.

If applicable, the hot melt adhesive can have waxes added to it in quantities from 0 to 45 wt %, preferably 5 to 30 wt %. The quantity is such that on the one hand the viscosity is lowered into the desired range, but on the other hand adhesion is not negatively influenced. The wax can be of natural origin, optionally also in chemically modified form, or of synthetic origin. Plant waxes and animal waxes can be used as natural waxes, also mineral waxes or petrochemical waxes. As chemically modified waxes, hard waxes such as montan ester waxes, sasol waxes, etc, can be used. Polyalkylene waxes and polyethylene glycol waxes are utilized as synthetic waxes. Petrochemical waxes such as petrolatum, paraffin waxes, microcrystalline waxes, and synthetic waxes are used by preference.

Plasticizers are used by preference in order to adjust the viscosity or flexibility, and are contained in the hot melt adhesive according to the present invention generally at a concentration from 0 to 20 wt %, by preference at a concentration from 1 to 10 wt %. Suitable plasticizers are medical-grade white mineral oils, naphthenic mineral oils, polypropylene, polybutene, polyisobutylene, polyisoprene oligomers, hydrogenated polyisoprene and/or polybutadiene oligomers, benzoate esters, phthalates, adipates, vegetable or animal oils, and derivatives thereof. Hydrogenated plasticizers are selected, for example, from the group of the paraffinic hydrocarbon oils. Polypropylene glycol and polybutylene glycol, as well as polymethylene glycol, are also suitable. Esters are also used, as applicable, as plasticizers, for example liquid polyesters and glycerol esters, or plasticizers based on aromatic dicarboxylic acid esters. Alkyl monoamines and fatty acids having, by preference, 8 to 36 carbon atoms can likewise be used.

The purpose of the stabilizers is to protect the adhesive composition from breakdown during processing. Antioxidants are to be mentioned here in particular, or also light protection agents. They are added to the hot melt adhesive usually in quantities of up to 3 wt %, by preference in quantities of approximately 0.1 to 1.0 wt %.

Further additives can also be incorporated into the hot melt adhesive in order to vary specific properties. These can be, for example, dyes, or fillers such as titanium dioxide, talc, clay, and the like.

The hot melt adhesive according to the present invention can furthermore contain adhesion promoters. Adhesion promoters are substances that improve the adhesion of the hot melt adhesive with respect to the substrate that is to be adhesively bonded. Adhesion promoters are intended in particular to improve the aging behavior of adhesive bonds under the influence of a moist atmosphere. Typical adhesion promoters are, for example, ethylene/acrylamide comonomers, polymeric isocyanates, reactive organosilicon compounds, or phosphorus derivatives. The wetting properties of the adhesive on the substrates can likewise be influenced.

The additives, such as plasticizers, stabilizers, or adhesion promoters, are known to one skilled in the art. They are commercial products, and one skilled in the art can select them in accordance with the desired properties. Care must be taken in this context that compatibility with the polymer mixture exists.

The hot melt adhesive according to the present invention is generally manufactured by mixing. In this context, all the components can be made ready simultaneously, heated, and then homogenized; or firstly the more-easily melted components are made ready and mixed, and then the further adhesive constituents are added, and finally further additives that are temperature-sensitive are added. It is also possible to manufacture the hot melt adhesive continuously in an extruder. After decanting or portioning of the completely homogenized mixture it is allowed to cool, whereupon it solidifies. The hot melt adhesive according to the present invention is of solid consistency and (aside from contaminants) free of solvents. Methods for manufacturing, decanting, and packaging hot melt adhesives according to the present invention are known to one skilled in the art. It is homogeneous in the solid and liquid phase, i.e. a melt is clear and not opaque or cloudy. No separation of the hot melt adhesive constituents is to be observed even if the melted state continues for a long time.

The application method depends on the nature of the substrate to be adhesively bonded, and on the suitable machines therefor. Spot application, planar application, or strip application can be involved. Application can occur by spray nozzle application, by extrusion coating, or with the use of roller application systems.

The hot melt adhesives according to the present invention have a viscosity that is coordinated with the application method. The hot melt adhesives possess a viscosity from 100 to 30,000 mPas, by preference 400 to 20,000 mPas, in particular 500 to 5000 mPas, at a temperature of 160° C. (measured with Brookfield Thermosel, spindle 27, at the temperature indicated).

In terms of utilization, it is advisable to use a hot melt adhesive having the lowest possible viscosity at application temperature. This ensures better applicability and easier delivery of the hot melt adhesive. Wetting of the substrate is also thereby promoted. After application onto the one substrate surface, the side of the hot melt adhesive facing the air must remain tacky and adhesion-capable for as long as possible. This "open time" depends on the melting behavior and crystallization behavior of the hot melt adhesive. Good application properties are achieved with the hot melt adhesive according to the present invention. No separation of individual constituents, or phase separation, is to be observed even when held for a longer period in the molten phase. Adhesion to synthetic surfaces or to finished surfaces is good. Bonding of the substrate and adhesive exists even at different temperatures.

The hot melt adhesives according to the present invention are used for adhesive bonding of substrates such as coated paper or board, films, plastics, or metallized, grease-repelling, or varnished surfaces. They are suitable in particular for adhesive bonding of plastic surfaces made of polyethylene and polypropylene as flexible film, as coated paper or board, as a solid substrate, e.g. bottles or cups, or for aluminum-coated surfaces. The hot melt adhesive according to the present invention can be used for adhesive bonding of multi-layer films, containers such as folding boxes, cartons, trays, or for adhesive bonding onto shaped substrates. Plastic parts can also be fastened to packages using a hot melt adhesive according to the present invention. For example, closures, spouts, or other shaped parts can be adhesively bonded onto a package. The adhesive bond serves for fastening, but can also seal an adhesive seam. Good processability is guaranteed by a long open time and excellent melt stability. The hot melt adhesives according to the present invention are notable in particular for very good adhesion on the aforesaid substrates. The bonds thereby produced remain flexible even at low temperature, but exhibit good stability at high temperature as well.

The present invention will be further explained below with the aid of examples.

EXAMPLES

Example 1

Comparison

| 35 parts | Ethylene/1-octene copolymer | (Affinity GA 1950) |
| 45 parts | Tackifying resin, hydrocarbon resin | (I-Marv P-125) |
| 20 parts | Paraffin wax | (Sasol wax H1) |

Example 2

| 20 parts | Ethylene/1-octene copolymer | (Affinity GA 1900) |
| 17 parts | Ethylene/1-octene copolymer | (Affinity GA 1950) |
| 45 parts | Tackifying resin, hydrocarbon resin | (I-Marv P-125) |
| 3 parts | Ethylene/ethyl acrylate/MSA terpolymer | (Lotader 8200) |
| 20 parts | Paraffin wax | (Sasol wax H1) |

Example 3

Comparison

| 20 parts | Ethylene/1-octene copolymer | (Affinity GA 1900) |
| 17 parts | Ethylene/1-octene copolymer | (Affinity GA 1950) |
| 40 parts | Tackifying resin, hydrocarbon resin | (I-Marv P-125) |
| 20 parts | Paraffin wax | (Sasol wax H1) |
| 3 parts | Ethylene/butyl acrylate | (Lotryl 35 BA 320) |

Example 4

| 28 parts | Ethylene/1-octene copolymer | (Affinity GA 1900) |
| 45 parts | Tackifying resin, hydrocarbon resin | (I-Marv P-125) |
| 7 parts | Ethylene/ethyl acrylate/MSA terpolymer | (Lotader 8200) |
| 20 parts | Paraffin wax | (Sasol wax H1) |

Example 5

| 40 parts | Ethylene/1-octene copolymer | (Affinity GA 1900) |
| 3 parts | Ethylene/ethyl acrylate/MSA terpolymer | (Lotader 8200) |
| 3 parts | SIS block copolymer | |
| 34 parts | Tackifying resin | (I-Marv P-125) |
| 20 parts | Paraffin wax | (Sasol wax H1) |

Method

The constituents were melted in a commercially available laboratory stirring unit at 160° C., and stirred until they were homogeneous. They were then decanted into suitable vessels to cool.

Results

|  | Example 1 | Ex. 2 | Ex. 3 | Ex. 4 | Ex. 5 |
|---|---|---|---|---|---|
| Compatibility | Yes | Yes | No | Yes | / |
| Melt stability | Yes | Yes | No | Yes | Yes |
| Viscosity 160° C. (mPas) | 1600 | 1550 | 1450 | 1650 | / |
| Open time (sec) | 6 | 8 | 7 | 8 | 8 |
| Adhesion (25° C.)/Adhesion (−10° C.) | | | | | |
| Kraft liner paper | o/− | +/+ | +/o | +/+ | +/+ |
| Varnished paper (Frövi) | −/o | +/+ | −/− | +/+ | |
| Board with OPP coating | −/− | o/o | −/− | +/o | |
| Paper with PE coating | −/− | +/+ | −/− | +/+ | +/+ |
| Board with PET coating | −/− | +/o | −/− | +/o | |
| Aluminum-coated film | −/− | +/o | −/− | +/+ | +/+ |

Test Method:

| Viscosity: | At indicated temperature; Brookfield Thermosel, spindle 27. |
| Open time: | Strips of adhesive were applied with a ductor blade at 170° C., and covered at successive time intervals with paper strips under light pressure. These were torn off to determine the time after which adhesive bonding was no longer possible. |
| Compatibility: | Transparent melt at 170° C. |
| Melt stability: | No phase separation at 170° C. after 75 hours. |
| Adhesion: | − Defective adhesion (adhesive break) |
| | + Good adhesion |
| | o Sufficient adhesion |
| | Under the conditions indicated, two strips of substrate were adhesively bonded to one another and stored for 3 days at 25° C. or −10° C. The samples were then tested for adhesion at the indicated temperature. |

The invention claimed is:

1. A hot melt adhesive consisting essentially of:
   a) 10 to 80 wt % of at least one copolymer, based on ethylene and/or propylene and $C_4$ to $C_{20}$ α-olefins, that is obtained by metallocene-catalyzed polymerization;
   b) 5 to 60 wt % of at least one tackifying resin;
   c) 0.1 to 15 wt % of at least one polymerizate based on $C_2$ to $C_5$ olefins and (meth)acrylic acid esters, the polymerizate containing COOH groups or anhydride groups; and
   d) 0 to 45 wt % additives.

2. The hot melt adhesive according to claim 1, wherein the polymerizate is a terpolymer having α,β-unsaturated carboxylic acids or anhydrides thereof.

3. The hot melt adhesive according to claim 2, wherein the terpolymer contains 0.1 wt % to 7.5 wt % α,β-unsaturated mono- or dicarboxylic acids or anhydrides thereof.

4. The hot melt adhesive according to claim 3, wherein the terpolymer contains a monomer selected from (meth)acrylic acid, crotonic acid, itaconic acid, maleic acid, fumaric acid, monoesters of maleic or fumaric acid with $C_1$ to $C_8$ alkanols, citraconic acid, or anhydrides thereof.

5. The hot melt adhesive according to claim 1, wherein the polymerizate is present in an amount of 1 to 10 wt %.

6. The hot melt adhesive according to claim 1, wherein the ethylene/propylene-based copolymer is present in an amount of 10 to 60 wt %, and has a molecular weight ($M_N$) of 1,500 to 50,000.

7. The hot melt adhesive according to claim 1, wherein the additive is a wax and is present in an amount of 5 to 30%.

8. The hot melt adhesive according to claim 1, further comprising an elastic thermoplastic polymer and is present in an amount of 0.1 to about 3 wt %.

9. An article which comprises the composition of claim 1.

10. The article of claim 9 which is a paper, plastic or metal coated substrate.

* * * * *